(No Model.)

G. C. TATE.
SHOW BOX AND REEL HOLDER.

No. 296,484. Patented Apr. 8, 1884.

Witnesses.
A. L. White
John M. Tuohay

Inventor.
Geo. C. Tate
by Wight & Brown
Attys.

N. PETERS, Photo-Lithographer, Washington, D. C.

UNITED STATES PATENT OFFICE.

GEORGE C. TATE, OF MALDEN, MASSACHUSETTS.

SHOW-BOX AND REEL-HOLDER.

SPECIFICATION forming part of Letters Patent No. 296,484, dated April 8, 1884.

Application filed May 14, 1883. (No model.)

*To all whom it may concern:*

Be it known that I, GEORGE C. TATE, of Malden, in the county of Middlesex and State of Massachusetts, have invented certain Improvements in Show-Box and Reel-Holder, of which the following is a specification.

This invention has for its object to provide an improved box for holding a number of reels on which are wound metallic picture-cord, each reel being contained in a separate compartment in the box, and all being journaled on a rod or spindle common to all, so that the cord can be drawn from any reel.

The invention consists in a box having apertures in its ends, and transverse partitions $e$, each having a central aperture, and a movable portion above said aperture, combined with the rod $b$, adapted to pass endwise through the end apertures of the box and the central apertures of the partitions, and to support reels placed between said partitions, the endwise movement of the rod enabling some of the reels to be released and removed from the box without disturbing or removing the whole series of reels, while the removability of the upper portions of the partitions enables them to be displaced while the rod is being inserted through the box and reels, so that the reels can be inclined to facilitate the insertion of the rod, as I will now proceed to describe and claim.

Figure 1:
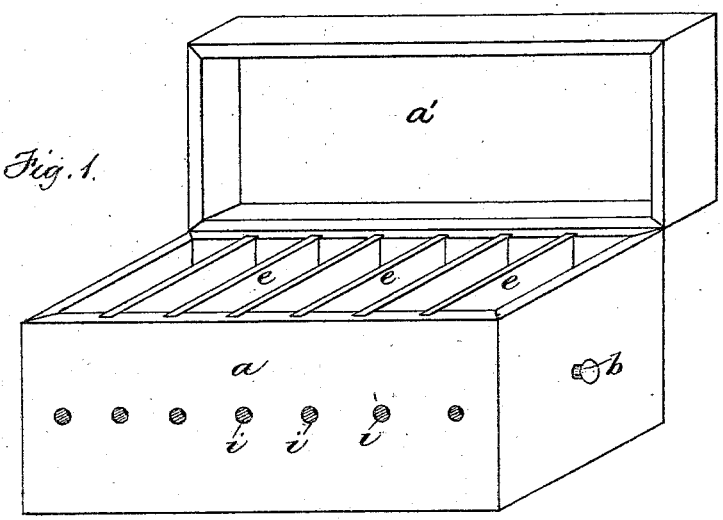
Figure 2:
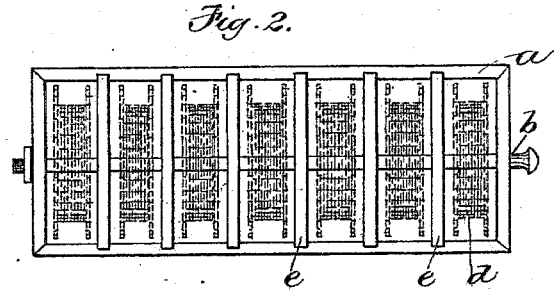
Figure 3:
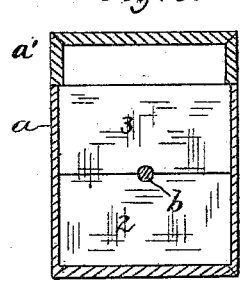
Figure 4:
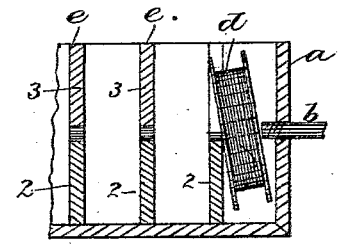

Of the accompanying drawings, forming a part of this specification, Figure 1 represents a perspective view of a box or holder embodying my invention. Fig. 2 represents a top view of the same with the cover removed. Fig. 3 represents a transverse vertical section, and Fig. 4 represents a partial longitudinal section.

The same letters of reference indicate the same parts in all the figures.

In the drawings, $a$ represents a box of suitable dimensions, having a cover, $a'$, and having apertures at its ends.

$b$ represents a metal rod passing through said end apertures, and extending through the box from end to end, and forming a pivot for a series of reels, $d$, containing wire picture-cord, said reels being shown in dotted lines in Fig. 2, and having central perforations, through which the rod $b$ passes.

$e\ e$ represent partitions in the box $a$, dividing the same into compartments, each adapted to hold a reel. Said partitions are perforated for the passage of the rod $b$, and each partition is made in two parts, 2 3, (see Figs. 3 and 4,) one below and the other above the rod $b$. The upper part, 3, of each partition is fitted in vertical grooves in the sides of the box, so that it can be easily inserted and removed.

The object of making the partitions as described is to enable the rod $b$ to be easily inserted in the perforations of the reels; and to this end, when a reel is being applied to the box, the part 3 of a partition forming one side of the compartment in which the reel is inserted is removed, so that the reel can be inclined, as shown in Fig. 4, and thus expose one of its sides to the view of the operator, who is thus enabled to guide the end of the rod $b$ into the central perforation of the reel. After this the part 3 is inserted in place. The same operation is repeated at each compartment until the reels are all in place.

The front of the box is provided with openings $i$—one for each compartment—through which the cords from the different reels pass.

It will be seen that the reels at or near one end of the box can be released, so that they may be removed, by partially withdrawing the rod, and after the desired reels have been removed the rod may be again pushed in, all this being accomplished without disturbing or removing the other reels of the series.

I am aware of the Patent No. 259,438, dated June 13, 1882, in which a box is shown having a rod supporting a series of reels, but not movable endwise; hence whenever a reel is removed it is necessary to raise the rod and the whole series of reels from the box. I do not therefore claim the invention shown in said patent.

I am also aware of English Patent No. 685, A. D. 1862, and do not claim the construction shown therein.

I claim—

The box $a$, having apertures in its ends, and transverse partitions $e$, each having a central aperture, and a movable portion above said aperture, combined with the rod $b$, adapted to pass endwise through the end apertures of the box and the central apertures of the partitions, and to support reels placed between said partitions, the endwise movement of the rod enabling some of the reels to be released and removed from the box without disturbing or removing the whole series of reels, while the removability of the upper portions of the partitions enables them to be displaced while the rod is being inserted through the box and reels, so that the reels can be inclined to facilitate the insertion of the rod, as set forth.

In testimony whereof I have signed my name to this specification, in the presence of two subscribing witnesses, this 5th day of May, 1883.

GEORGE C. TATE.

Witnesses:
C. F. BROWN,
A. L. WHITE.